(12) United States Patent
Fort et al.

(10) Patent No.: US 6,761,579 B2
(45) Date of Patent: Jul. 13, 2004

(54) SECURE MOUNTING ASSEMBLY FOR A RETAIL PRODUCT DISPLAY

(75) Inventors: Calvin L. Fort, Franklin, WI (US); Paul C. Burke, Lake Forest, IL (US)

(73) Assignee: Telefonix, Inc., Chicago, IL (US)

( * ) Notice: Subject to any disclaimer, the term of this patent is extended or adjusted under 35 U.S.C. 154(b) by 90 days.

(21) Appl. No.: 09/872,230

(22) Filed: Jun. 1, 2001

(65) Prior Publication Data

US 2001/0049222 A1 Dec. 6, 2001

Related U.S. Application Data

(63) Continuation-in-part of application No. 09/039,825, filed on Mar. 16, 1998, now Pat. No. 6,386,906.

(51) Int. Cl.[7] .............................................. H01H 13/72
(52) U.S. Cl. .................................... 439/501; 340/568.1
(58) Field of Search ............ 439/501; 340/568.1–568.9, 340/693.1–693.13, 571

(56) References Cited

U.S. PATENT DOCUMENTS

| | | |
|---|---|---|
| 4,455,464 A | 6/1984 | Leyden |
| 4,620,182 A | 10/1986 | Keifer |
| 4,736,826 A | 4/1988 | White et al. |
| 4,772,878 A | 9/1988 | Kane |
| 5,003,292 A | 3/1991 | Harding et al. |
| 5,072,213 A | 12/1991 | Close |
| 5,094,396 A | 3/1992 | Burke |
| 5,146,205 A | 9/1992 | Keifer et al. |
| 5,172,098 A | 12/1992 | Leyden et al. |
| D335,439 S | 5/1993 | Leyden et al. |
| 5,289,559 A | 2/1994 | Wilson |
| D345,092 S | 3/1994 | Leyden et al. |
| 5,341,124 A | 8/1994 | Leyden |
| 5,421,667 A | 6/1995 | Leyden et al. |
| 5,467,075 A | 11/1995 | Rand |
| 5,543,782 A | 8/1996 | Rothbaum et al. |
| 5,552,771 A | 9/1996 | Leyden |
| 5,565,848 A | 10/1996 | Leyden et al. |
| 5,570,080 A * | 10/1996 | Inoue et al. ................. 340/571 |
| 5,577,855 A | 11/1996 | Leyden et al. |
| 5,699,591 A | 12/1997 | Kane |
| 5,726,627 A | 3/1998 | Kane |
| 5,821,857 A | 10/1998 | Rand |
| 5,861,807 A | 1/1999 | Leyden |
| 5,936,525 A | 8/1999 | Leyden et al. |
| 6,027,277 A | 2/2000 | Leyden et al. |
| 6,039,498 A | 3/2000 | Leyden et al. |
| 6,087,939 A | 7/2000 | Leyden et al. |
| 6,104,289 A | 8/2000 | Rand |
| 6,147,603 A | 11/2000 | Rand |

FOREIGN PATENT DOCUMENTS

| | | |
|---|---|---|
| JP | 9054882 | 2/1997 |
| WO | 17393 | 2/2000 |
| WO | 23073 | 4/2000 |

* cited by examiner

Primary Examiner—Lincoln Donovan
(74) Attorney, Agent, or Firm—Grossman & Flight, LLC

(57) ABSTRACT

A mounting assembly for a product, such as a video camera comprises a shroud for holding a security system sensor and a fastener for attaching the shroud to the product so as to hold the sensor against the product. The shroud further comprises a mounting flange, a cavity for holding electrical connectors, and passageways for cables. The shroud has an opening for receiving electrical connectors and a cover therefor to limit access to the electrical connectors. A fatigue reducing grommet is attached to a main cable at its entry point into the shroud. The shroud includes a seat for receiving the sensor, the sensor being connected to a security system via the electrical connectors. A fastener extends through a flange of the shroud, the cover and the sensor and into the product. An optional power cable carries power from the main cable to power the product. Thereby the sensor is securely attached to the product and the cables and connectors for the security system are neatly tucked away in the shroud. Enclosing the electrical connectors in the shroud improves security and enhances the appearance of the product display.

24 Claims, 1 Drawing Sheet

SECURE MOUNTING ASSEMBLY FOR A RETAIL PRODUCT DISPLAY

CROSS REFERENCE

This application is a continuation in part of currently U.S. patent application Ser. No. 09/039,825, filed Mar. 16, 1998, now U.S. Pat. No. 6,386,906 which is hereby incorporated by reference.

FIELD OF THE INVENTION

This disclosure relates to retail store security systems for electronic products such as video cameras and the like, and more specifically relates to cable management assemblies and mounting devices for such electronic products.

BACKGROUND OF THE INVENTION

Video cameras and other electronic products are commonly sold in retail stores ranging from small shops, to mass merchandisers, to department stores and discount houses. The cameras or other products are commonly installed in operating condition on display tables so that consumers may pick up various products, examine and test them.

Theft is a constant concern, particularly for larger stores. To combat this problem security systems have been developed. Security systems in current use typically comprise an electronic alarm module and multiplicity of sensors. A sensor is attached to each product, e.g., video camera, for which protection is desired. The alarm module monitors each sensor. If a sensor status changes, as a result of the sensor being removed from the product, a cut cable or other tampering, an alarm is sounded.

There are many patents on security systems including the following:

| U.S. Pat. No. | Date | Inventors |
| --- | --- | --- |
| 5,172,098 | Dec. 15, 1992 | Leyden et al. |
| 5,543,782 | Aug. 6, 1996 | Rothbaum et al. |
| 5,552,771 | Sep. 3, 1996 | Leyden et al. |
| 5,726,627 | Mar. 10, 1998 | Kane |
| 5,821,857 | Oct. 13, 1998 | Kane |

The foregoing patents are hereby incorporated by reference.

Thieves have sought to bypass security systems in several ways. One way is to intentionally trip the alarm system with feigned innocence one or more times. In most alarm systems, the sensors are hardwired to the security system. The wiring includes one or more electrical connectors that facilitate connection of the sensors to the electronic devices. Thieves have been known to unplug electrical connectors, which does not damage to the product or system, but interrupts the security circuit triggering the alarm. When the alarm is activated, store personnel will locate the unplugged connector, admonish the apparent customer, and reset the system. One or more thieves acting in concert have been known to repeatedly trip the security system. The repeated alarms frustrate store personnel causing them to disable the security system or passively act in response to new alarm events. Once this environment has been created, the thieves will cut one or more electronic devices free from the display table, and abscond with surprising quickness.

Another problem in the art involves securely mounting sensors to products in a way that does not damage the product and which is tamper resistant. A commonly used sensor is a plunger type switch that is attached to the electronic device or other product such that when installed on a product, the plunger is depressed closing the sensor circuit. If the sensor is removed from the product, the plunger extends, opening the circuit and triggering an alarm. The sensor is typically attached to the product with an adhesive or a mechanical fastener. One drawback is that the adhesive or fastener may damage the product. Another is that thieves will remove the sensor from the product, with feigned innocence, triggering false alarms. This brings us back to the same problem mentioned in the preceding paragraph.

It is an object of the retail industry to display products in an attractive manner that is conductive to sale. For example, it is desirable to mount video cameras and other electronic devices on a shroud, which elevates the product and places it in an operative position. Further, it is desirable to minimize the appearance of security systems without sacrificing functionality. Some security systems are obtrusive and interfere with the customers handling and testing of the products.

There is, therefore, a need in the industry for improvements in security systems and retail displays of products such a video cameras and the like.

OBJECTS OF THE INVENTION

It is an object of the invention to provide a shroud that encloses electrical connectors to resist tampering therewith.

It is another object of the invention to securely mount a conventional sensor to a product, such as a video camera, in a tamper resistant manner.

It is a final object of the invention to provide an apparatus for an attractive and secure retail product display.

SUMMARY OF THE INVENTION

In attainment of these and other objects of the invention, a mounting assembly has been provided for the aesthetic and secure display of products, such as video cameras. In its most basic form the assembly of the invention comprises a shroud having a holder at the top of the shroud for receiving a security sensor. A fastener is provided to attach the shroud and sensor to the product. With video cameras and many other products, the product housing contains a threaded hole by which the camera or other product may be mounted on a tripod or other device. The fastener of the invention is preferably a bolt with threads to mate with the product. The holder portion of the shroud holds the sensor in a secure position against the product in a manner that is tamper resistant as will become more apparent in the description that follows.

Preferably, the shroud of the invention has an internal cavity for enclosing electrical connectors, thereby limiting access to the electrical connectors. Enclosing the electrical connectors in the shroud improves security and enhances the appearance of the product display. More specifically, the shroud is provided with an opening for insertion of at least one pair of electrical connectors and one or more passageways for cables running to and from the connectors. The opening is provided with a cover that is held tight when the shroud is fastened to the product. Thereby, access to the connectors is limited and the risk of tampering is reduced.

A main cable passes through a passageway in the shroud and is connected to one side of the pair of electrical connectors. A fatigue reducing grommet is preferably provided over the cable at its point of entry into the shroud. The main cable comprises conductors carrying a security circuit. Optionally, the main cable may include conductors for other purposes, such as power for the product or audio/video signals. The other side of the electrical connector includes a sensor cable running to the sensor. It may also include additional cables running to the product for power, and in some cases, audio/video signals. These additional cables may be connected to the main cable with separate connectors if desired. Excess or slack cable may be stored in the shroud cavity thereby improving the appearance of the display.

The lower portion of the shroud preferably comprises a pedestal adapted to be received in a tubular holder bolted or otherwise fastened to the product display. Desirably, the main cable is connected to the security system under the product display table surface. The cable extends upwardly through the fixed tubular holder and enters the shroud at the bottom of the pedestal. The security system may included a retractable cord reel mounted to the display for retractably retaining the main cable.

Accordingly, the video camera or other product is displayed in an upright position on the shroud of the invention. The security sensor is bolted to the product in an unobtrusive location. Excess cable and electrical connectors are hidden from view and secured from would be thieves. The objects of the invention have accordingly been met in a facile manner. Other attributes and benefits of the present invention will become apparent from the following detailed specification when read in conjunction with the accompanying drawings.

DETAILED DESCRIPTION OF THE PREFERRED EMBODIMENT

Figure 1:
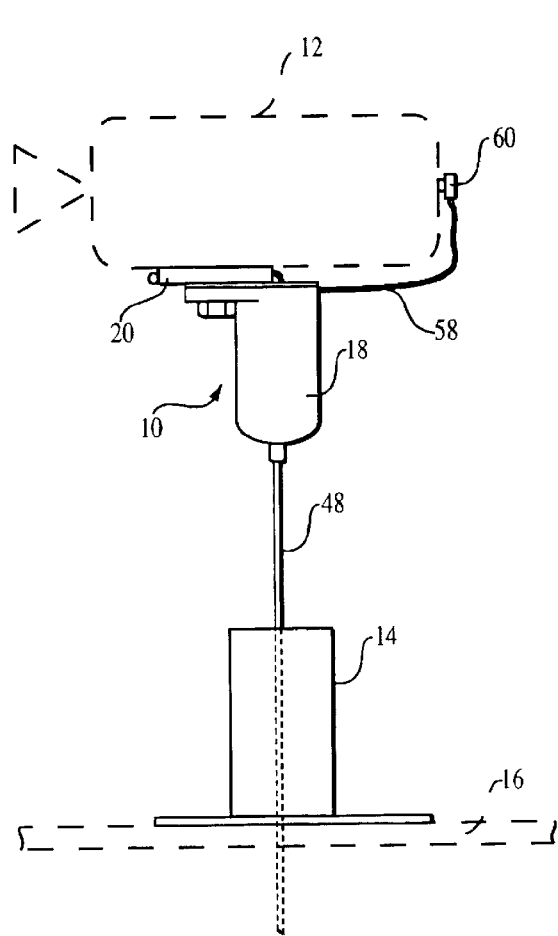
FIG. 1 is an elevational view of a preferred embodiment of the security shroud and shroud assembly of the invention showing the assembly attached to a video camera.

Turning now to the drawings, FIGS. 1–4 illustrate a preferred embodiment of the security shroud assembly of the invention, indicated generally at 10. The assembly 10 is attached to a video camera 12, which has been lifted out of base unit comprising a tubular holder 14. The holder 14 is attached to a product display table 16.

The assembly of the invention comprises a shroud 18, security sensor 20 and fastener 22. The shroud preferably has a lower pedestal portion 24, a mounting flange 26, an interior cavity 28, a cover plate 30, and cable passageways 32 and 34. The optional pedestal 24 is adapted to be received in holder 14. The sensor 20 is a conventional, donut-shaped sensor. Sensors of this type have been in wide spread use for many years and are well known to those skilled in the art. The flange portion 26 of the shroud preferably includes a sensor seat comprising a post 36, which extends into the hole within the center of sensor 20. A bore 38 extends through post 36 and flange 26. Fastener 22 passes through bore 38. Post 36 is shorter than the thickness of the sensor so that the fastener will snugly clamp the sensor between the shroud and product.

In the preferred embodiment the sensor seat is shown as a post which fits into an opening in the sensor, but it should be understood that the seat could have other configurations. For example, the seat could be cup shaped to receive all or a portion of the sensor within the seat. Also, in the preferred embodiment the sensor and retaining members are round. It should be understood that other shapes, e.g., a polygonal shape, could be used equally well. All that is required is that seat perform the function of retaining the sensor so that the shroud and sensor together may be attached to the product. These and other variations seat will be apparent to those skilled in the art and all such variations are intended to be covered by the term "seat."

Fastener 22 is preferably a conventional bolt having threads to mate with the mounting nuts carried by the product, e.g., video camera. Other forms of fasteners could be used, so long as the fastener is adapted to mate with the product.

Shroud 18 has an open top, indicated generally at 40, through which an electrical connector 42 may be inserted into and enclosed with cavity 28. Opening 40 is covered by a cover plate 30 to limit access to the connector. Other means may be used to cover the opening. For example, the sensor 20 could be positioned to substantially cover the opening, or the shroud may be fastened to the product in such a manner that a portion the product covers the opening. The mechanism or means for covering the opening is not important as long as access to the connector is limited. Other types of covers will occur to those skilled in the art and all such covers are intended to be included in the appended claims.

The preferred cover plate 30 includes two holes 44 and 46. Hole 44 is designed to receive sensor-retaining member 36. The cover 30 includes one or more keys 48 that mate with one or more corresponding keyways in member 36. This prevents rotation of the cover plate relative to the shroud 18, which could expose the opening 40. Opening 46 provides a passageway for sensor cable 56. When the shroud assembly is installed on a product, a significant portion of hole 46 is covered by sensor 20, thereby limiting access to connector 42.

A main cable 48 extends from a source (not shown) through holder 14 an into shroud 18. The main cable 48 preferably enters through a passageway 32 at the bottom of the bottom of pedestal portion 24. A grommet molded of an elastomeric material is provided in the opening 32 and over the cable 48 to protect the connection point from fatigue failure. A preferred cable construction comprises an outer-jacket of braided nylon or other textile. The grommet is desirably placed over an end of the braided jacket and then the jacket is braided back over the grommet to firmly secure the grommet and jacket together. Thereby, stress applied to the grommet is transferred to the braided nylon jacket and not to the conductors. Cable life is increased as a result.

Grommet 50 comprises a base portion 53 and head 55. The base portion 53 is removably held in opening 32. The head 55 of the grommet is substantially larger than opening 32 so as to prevent the grommet from being pulled through the opening 32. Opening 32 is larger than the diameter of main cable 48 and is slightly larger than the base portion 53 of the grommet. Accordingly, the shroud 18 may be slid downwardly on cable 48 so that connectors 42 may be removed from cavity 28.

Conductors 51 that comprise main cable 48 are connected to one end 52 of the pair of electrical connectors 42. The connectors 42 may be of any type. Suitable connectors are well known to persons skilled in the art. A sensor cable 56 is connected to the other end 54 of the connectors. Optionally, a power cable 58 may be connected to connector 54. Connector 54 is shown a single connector, but can be split to comprise two or more connectors, as is known in the art, so that power cable 58 is independent of sensor cable 56. Power cable 58 carries plug 60 adapted for connection with a corresponding jack on the video camera or other product. Further, it should be appreciated that it is not strictly necessary to run both the security circuit and power through connector 42. In some cases it may be desirable to have the security circuit cable 56 to be unitary and integral with the main cable.

Cable 48 is connected to a security system (not shown). As is well known in the art, a security circuit connected to the sensor monitors the product. If the sensor is removed from the product or if the cable is cut, an alarm is sounded. Cable 48 preferably carries power for the product in addition to the security circuit. The cable may carry one or more power voltages. In co-pending Burke, application Ser. No. 09/039,825, filed Mar. 16, 1998, an electrical adapter is shown and described that carries plural signals, including plural power voltages, as may be required by different cameras or other products. The disclosure of application Ser. No. 09/039,825 are incorporated by reference. If cable 48 is configured to carry plural voltages, then connector 54 is pinned to pick up a selected voltage for the desired product. Likewise plug 60 is selectively configured for the desired product. Thereby, the shroud assembly may be generic for various product of different voltages. The power cable 58 with associated connector 54 and plug 60 may be selected for each particular product.

Figure 2:
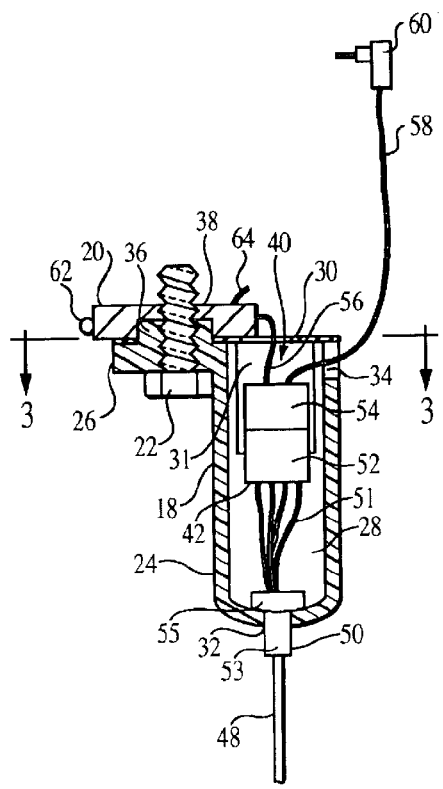
FIG. 2 is a vertical cross-section of the preferred embodiment of the security shroud and shroud assembly of the invention.
Figure 3:
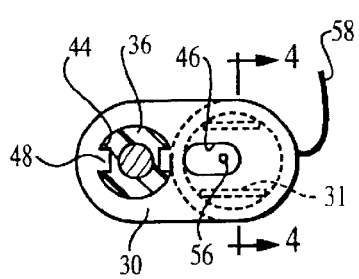
FIG. 3 is a horizontal cross-section taken along line 3—3 of FIG. 2.
Figure 4:
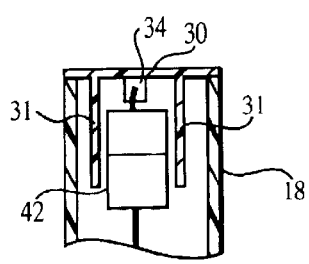
FIG. 4 is a horizontal cross-section taken along line 4—4 of FIG. 3.

It is preferred that an anti-rotation device be provided for connectors 42. Rotation of the connector can cause fatigue on the cable conductors resulting in cable failure. One form of an anti-rotation device suitable for rectangular connectors is shown in FIGS. 2–4. It comprises a pair of wings 31 on either side of the connector 42. The wings can be integrally form with the cover 30.

Sensor 20 includes typically includes a light emitting diode 62 and plunger 64 which is mechanically linked to a switch (not shown) within sensor 20. Although a donut configuration, plunger-switch type of sensor has been shown, it will be appreciated that the subject invention is applicable to all types of sensors.

As indicated, member 18 is preferably in the form of a shroud having a downwardly extending pedestal portion 24. However, this shape is not strictly necessary. For some products or store display systems, a "pedestal" or other downwardly depending shape may not be appropriate. Further, although a flange 26 is shown for facilitating fastening of the shroud to the product, a flange is not strictly required and other means for receiving a fastener may be employed, e.g., the shroud could be modified to receive as fastener centrally though cavity 28. It should be understood that the present invention, as defined by the appended claims, is not limited any particular shape or configuration of member 18. Member 18 may he fabricated for any material, but is most preferably manufactured of molded plastic.

While the preferred embodiments of the present invention have been shown and described, it is to be understood that these are merely the best mode for practicing the invention that the inventors foresee at the present time, and that various modifications and changes could be made thereto without departing from the scope and spirit of the invention as defined in the appended claims.

What is claimed is:

1. A mounting assembly comprising:
    a shroud having a seat configured to receive a security sensor and a passage configured to carry a sensor cable associated with said security sensor, said seat orientated to hold said security sensor against a product; and
    a fastener configured to extend through said shroud, a fastener passage of said security sensor, and into said product, said fastener configured to secure both said security sensor and said shroud to said product so that said security sensor is captured between said product and said shroud.

2. A mounting assembly as in claim 1, wherein said shroud comprises a cavity configured to receive at least one of said senor cable and a cable connector coupled to said sensor cable.

3. A mounting assembly as in claim 2, wherein said cavity is configured to carry said cable connector, and wherein said cable connector connects said sensor cable to a main cable.

4. A mounting assembly as in claim 3 further comprising a grommet disposed in a main cable passage of said cavity to carry said main cable.

5. A mounting assembly as in claim 4, wherein said grommet comprises an elastomeric member, and wherein said main cable comprises a braided fabric jacket configured to cover said elastomeric member.

6. A mounting assembly as in claim 3 further comprising a power cable connected to said cable connector, said power cable being adapted for electrical connection to the product.

7. A mounting assembly as in claim 3, wherein said shroud comprises an access opening into said cavity.

8. A mounting assembly as in claim 7 further comprising a cover configured to overlay said access opening.

9. A mounting assembly as in claim 8, wherein said cover comprises at least a portion of said product.

10. A mounting assembly as in claim 8, wherein said cover comprises at least a portion of said security sensor.

11. A mounting assembly as in claim 3 further comprising a holder configured to restrict rotation of said cable connector.

12. A mounting assembly as in claim 11, wherein said a holder comprises a pair of wings on a cover plate configured to extend on opposite sides of said cable connector, and wherein said cover plate is configured to cover an access opening of said shroud.

13. A mounting assembly as in claim 1, wherein said shroud comprises a flange, and wherein said fastener extends through said flange and said sensor to attach said shroud and said sensor to said product.

14. A mounting assembly as in claim 13, wherein said seat comprises a post on said flange, and wherein said fastener extends through said post and a hole in said sensor.

15. A mounting assembly as in claim 2, wherein said shroud comprises a pedestal portion to couple said shroud to a base.

16. A mounting assembly as in claim 15, wherein said base comprises a holder configured to receive said pedestal portion.

17. A mounting apparatus comprising:
    a security sensor having a cable;
    an electrical connector said cable;
    a shroud having a seat configured to receive said sensor and a compartment configured to receive said electrical connector; and
    a fastener configured to extend through said shroud, a passage of said sensor, and into a product, said fastener being configured to secure both said sensor and said shroud to said product so that said security sensor is captured between said product and said shroud.

18. A mounting apparatus comprising:

a security sensor having a cable;

a shroud having a seat configured to receive said sensor and a compartment configured to carry at least one of said cable and an electrical connector;

a grommet disposed on said cable and removably held in an opening of said shroud; and a fastener configured to extend through said shroud, a passage of said sensor, and into a product, said fastener being configured to secure both said sensor and said shroud to said product.

19. A mounting apparatus for a retail product display, the product having an electrical power input, comprising:

a security sensor;

a main cable carry a security circuit and electrical power for the product;

a sensor cable connecting said main cable security circuit to said sensor;

a power cable connected to said main cable for carrying power to the product;

a shroud having a seat receiving said sensor and a passage for receiving said main cable; and a fastener extending through said shroud and into the product and fastening both said sensor and said shroud to the product.

20. A mounting apparatus as in claim 19 further comprising a pair of electrical connectors, said main cable connected to one connector, and said security cable and said power cable connected to the other said connector; said pair of connectors being held within said shroud.

21. A mounting assembly as in claim 8, wherein said cover comprises a cover plate.

22. A mounting assembly comprising:

a first member having a bore, the first member configured to carry a sensor having a sensor cable coupled to a cable connector;

a second member having a cavity configured to carry at least one of the sensor cable, the cable connector, a power cable, and a main cable; and a fastener configured to secure the mounting assembly and the sensor to a product through the bore of the first member and a passage of the sensor so that the sensor is captured between the product and the first member.

23. A mounting assembly comprising:

a housing having a first portion and a second portion, the first portion being configured to carry a sensor, and the second portion being configured to carry one or more cables within a cavity;

a fastener configured to couple the first portion and the sensor to secure the housing and the sensor to a product through a bore of the first portion and a passage of the sensor so that the sensor is captured between the product and the housing;

a grommet coupled to a first end of the second portion, the grommet being configured to carry at least one of the one or more cables; and a cover configured to couple a second end of the second portion to secure the one or more cables within the cavity of the second portion.

24. A mounting assembly comprising:

a housing having a sensor portion and a pedestal portion, the sensor portion being configured to carry a sensor, and the pedestal portion being configured to carry one or more cables;

a fastener configured to couple the sensor portion and the sensor to secure the housing and the sensor to a product through a bore of the sensor portion and a passage of the sensor so that the sensor is captured between the product and the housing; and a holder coupled to a surface the holder configured to carry at least one of a portion of the pedestal portion and the one or more cables.

* * * * *